Aug. 8, 1961  L. J. BERGGREN  2,995,159
PORTABLE PLASTIC INJECTION DEVICES
Filed Dec. 23, 1957  3 Sheets—Sheet 3
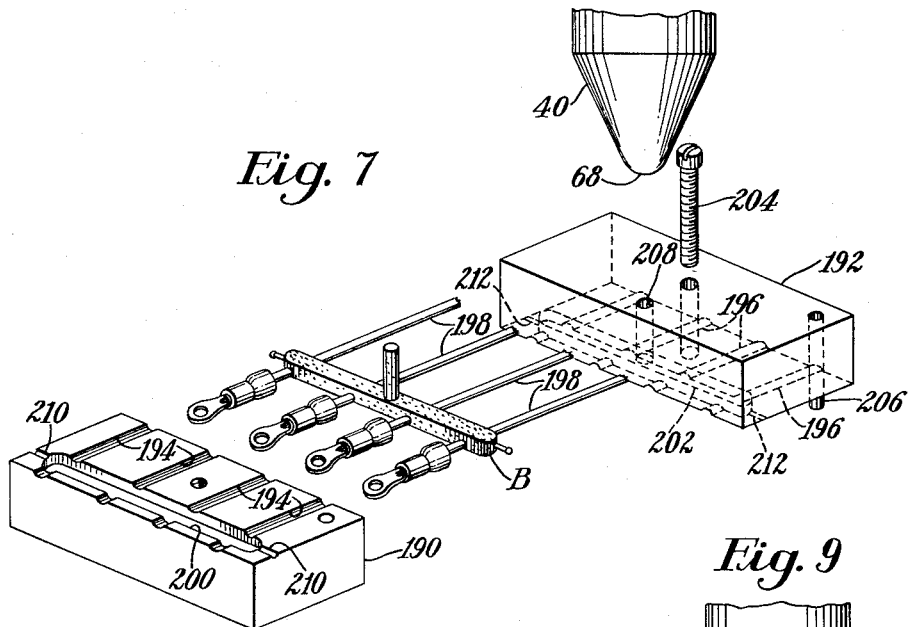
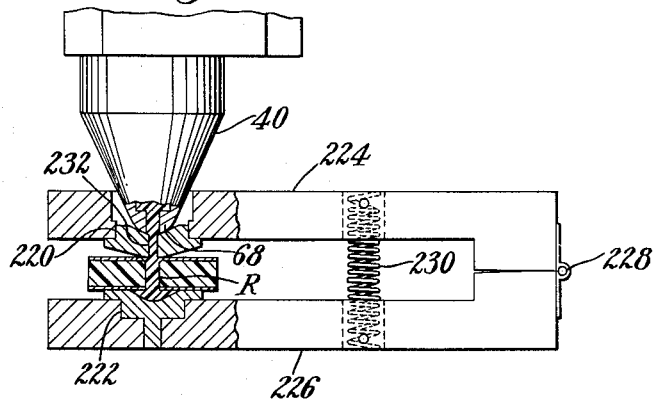
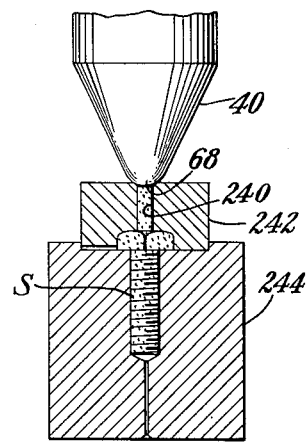
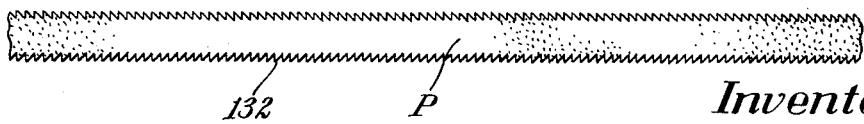
*Inventor*
Loring J. Berggren
By his Attorney

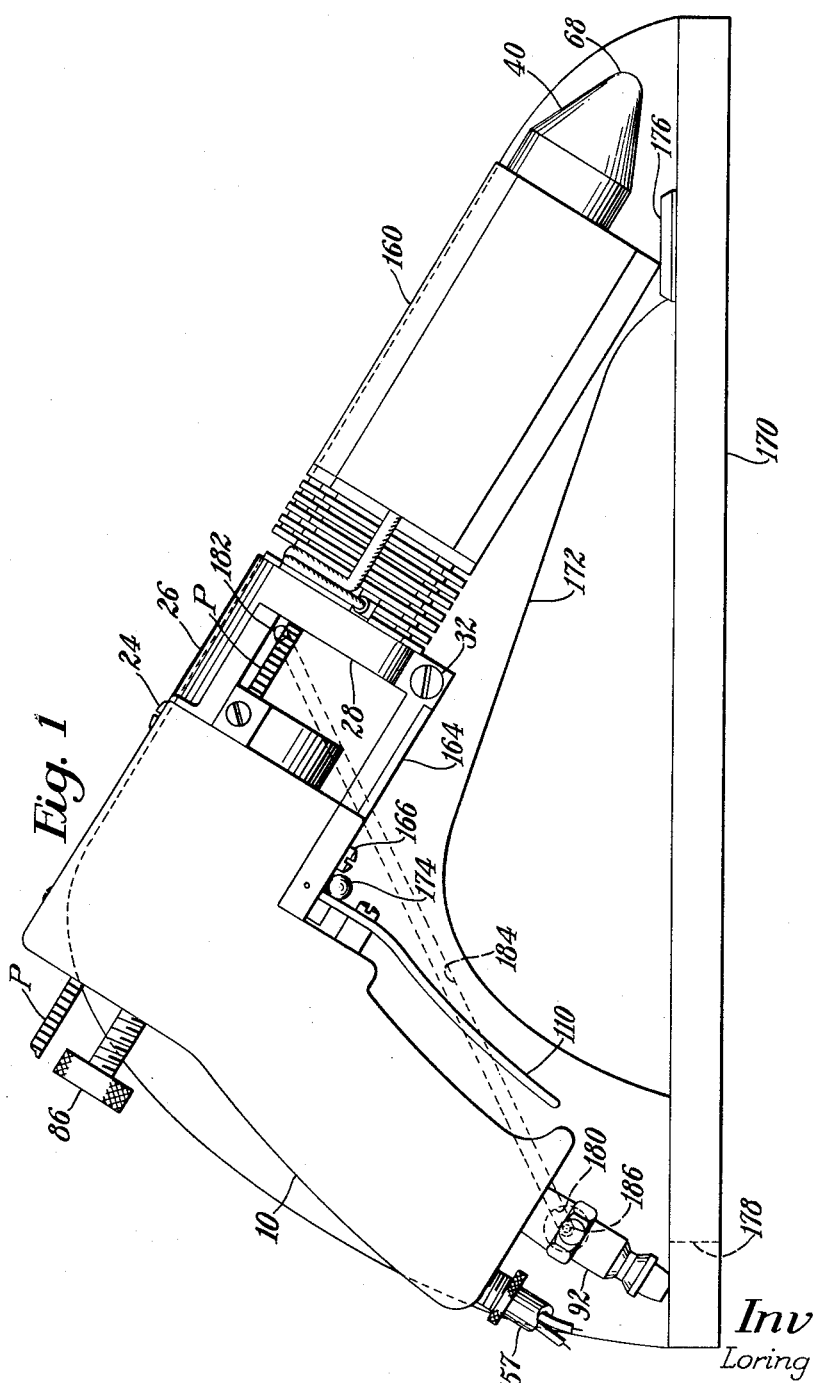

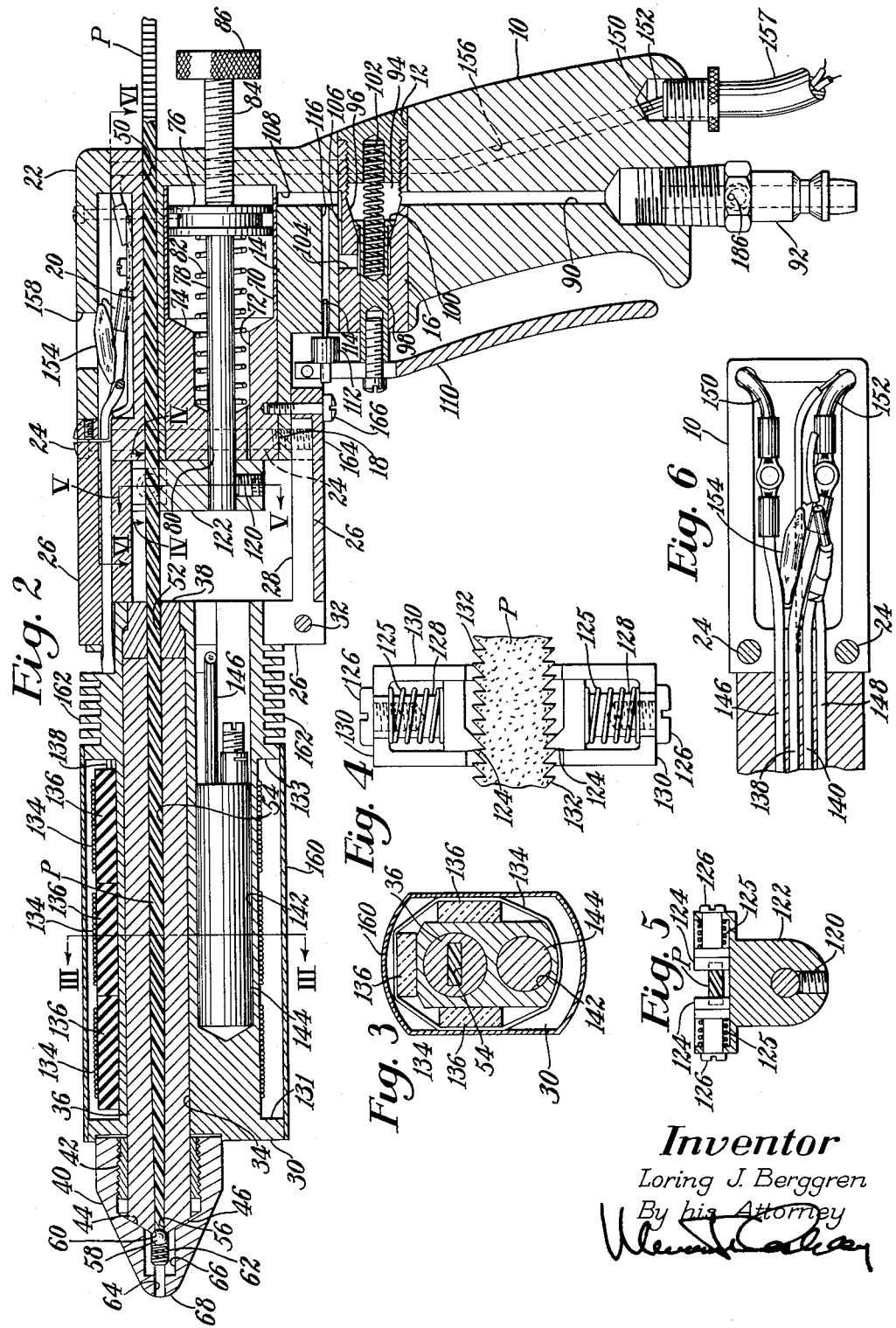

United States Patent Office 2,995,159
Patented Aug. 8, 1961

2,995,159
PORTABLE PLASTIC INJECTION DEVICES
Loring J. Berggren, Beverly, Mass., assignor to United Shoe Machinery Corporation, Flemington, N.J., a corporation of New Jersey
Filed Dec. 23, 1957, Ser. No. 704,650
2 Claims. (Cl. 141—82)

This invention relates to portable plastic injection devices, and particularly to a novel and improved device for use in injecting predetermined amounts of molten thermoplastic material into molds or other mold-like cavities.

In the field of modern plastics there are numerous operations involving the formation of an object out of thermoplastic material by injecting a predetermined amount of molten thermoplastic material into a mold or other mold-like cavity. For example, it has been proposed to join the several parallel wires of an electrical harness together by means of a bridle, or keeper bar, molded in place out of thermoplastic material, by placing the several wires in a suitable mold and injecting molten thermoplastic material thereinto; to fasten several laminations of a composite structure together by means of a plastic rivet formed in place by the injection of molten thermoplastic material into a mold-like cavity formed by suitable dies and an aperture through the laminations; and to make a plastic cap-screw or similar machine element by injecting molten thermoplastic material into a suitably shaped cavity formed in a mold. In many instances like those mentioned above it is not always practical to utilize conventional injection molding apparatus, but instead the use of a portable injecting device is required or is at least much more convenient and desirable.

A principal object of this invention is to provide a novel and improved portable plastic injection device which is especially well adapted for uses mentioned above and other similar applications, which is easy to operate, dependable in action, and of relatively simple and inexpensive construction. To that end, the herein illustrated device, which comprises a body portion including a heated chamber provided with a passageway and a handle on which the body portion is mounted, is provided with power operated means for feeding a variably predetermined linear portion of a strip of thermoplastic material into one end of the passageway, thereby to cause a corresponding volume of molten thermoplastic material to be extruded through the other end of the passageway, together with a control member conveniently located adjacent to the handle for effecting operation of the power operated means. More particularly, a nozzle member, having a generally spherical operating end and a discharge opening communicating with one end of the passageway in the heated member, is carried by that member, and a spring-loaded valve is provided for normally closing that end of the passageway, while the means for feeding a variably predetermined linear portion of a strip of thermoplastic material into the other end of the passageway, thereby to cause a corresponding volume of molten material to be extruded through the first-mentioned end of the passageway, comprises a reciprocable member having detent means for engaging and feeding a strip of thermoplastic material and which is movable in one direction by fluid pressure operated means and in the opposite direction by yieldable means, together with means for varying the extent of movement of the reciprocable member. Also, the control member is movable from an inoperative to an operative position by the fingers of the operator as he grasps the handle to present the portable injection device to position for use, and yieldable means are provided for returning the control member to inoperative position when released by the operator, for thereby effecting a single reciprocation of the reciprocable member in response to each movement of the control member to operative position and back to inoperative position.

With this novel and improved device, which is readily portable by the operator, easy to use, and dependable in operation, the operator, by suitably varying the predetermined linear portion of the strip of thermoplastic material which is fed into the passageway in the heated member, where it is melted, during each reciprocation of the detent carrying member, and by appropriately manipulating the aforementioned control member, can accurately and readily regulate the volume or amount of molten thermoplastic material injected from the device and into the particular cavity or mold being used. Preferably, and as herein illustrated, the strip of thermoplastic material used with the subject device is provided along its opposite edges with serrations with which the detent means on the reciprocable member make positive engagement, thus assuring that the desired and variably predetermined linear portion of the strip will be fed into the passageway on each reciprocation of the reciprocable member.

The above and other objects and features of the invention will be apparent in the following detailed description of the preferred embodiment which is illustrated in the accompanying drawings, and will be pointed out in the claims.

In the drawings:

FIG. 1 is a view in side elevation of a device embodying the features of this invention shown supported on a stand;

FIG. 2 is a view in longitudinal vertical section of the device shown in FIG. 1;

FIG. 3 is a view of the device in transverse vertical section substantially on line III—III of FIG. 2 and looking in the direction of the arrows;

FIG. 4 is a plan view at an enlarged scale of a portion of the device;

FIG. 5 is a view of a portion of the device shown in transverse vertical section substantially on line V—V of FIG. 2 and looking in the direction of the arrows;

FIG. 6 is a plan view of another portion of the device with certain parts removed and others shown in horizontal section substantially on line VI—VI of FIG. 2;

FIGS. 7, 8 and 9 are views illustrating different uses of the device of this invention; and FIG. 10 is a plan view of a portion of a strip of thermoplastic material used in the device.

Referring to these drawings, and particularly to FIG. 2, the device of this invention is constructed in the form of a hand-held gun having a handle or stock portion 10, preferably made of some suitable non-metallic and heat insulating material, and formed with two bores 12, 14 adapted to receive, respectively, a valve sleeve 16 and a cylinder sleeve 18, and an upper recess 20 closed by a cover 22. Secured to this handle or stock portion by means of screws 24, 24, see also FIG. 6, is a bracket member 26 which is cut away at 28 to provide a transverse opening. At its left-hand end, FIG. 2, this bracket is partially split and is clamped to one end of a body portion 30, formed of aluminum, by means of a clamp screw 32. Fitted within a cylindrical bore 34, formed in a body portion 30, is an aluminum barrel 36 and a lead-in or entrance bushing 38 formed of "Teflon" (polytetrafluoroethylene) or similar heat insulating material having a low coefficient of friction, these parts being held in place by means of a nozzle member 40, which is threaded onto a cylindrical boss 42, formed integrally on one end of the body portion 30, and which has a conical surface 44 bearing against a complementally shaped surface 46 on the barrel.

The handle or stock portion 10 is provided with a guideway 50 which is of rectangular shape in cross section and of a suitable size to receive a strip of thermoplastic material P. Similarly, the lead-in bushing 38 has a guideway 52 of the same cross-sectional shape as the guideway 50, while the barrel 36 is formed with an axially extending passageway 54 which, for the greater portion of its length, is of the same shape and size as the guideways 50 and 52 but which is tapered down adjacent to its left-hand end to a cylindrical opening 56. This opening is normally closed by a ball valve 58, held against a seat 60 on the end of the barrel by means of a coil spring 62. Extending across a discharge passage 64, formed in the nozzle 40, is a slot 66. As will presently appear, when a strip of thermoplastic material P is fed along the passageway 54, its leading end is melted and the molten plastic is forced against the ball valve 60, thus lifting it away from its seat so that molten adhesive is extruded through the discharge passage 64. Preferably the nozzle 40 is provided with a rounded or spherical end 68.

For feeding a strip of thermoplastic material P through the guideways 50, 52 and along the passageway 54 in the barrel 36, in a controlled and measured manner, the following arrangement is provided. The bushing 18 is formed with a larger cylindrical bore 70 and a smaller cylindrical bore 72, joined by a conical shoulder portion 74. Slidably mounted within the larger bore 70 is a piston 76 having a piston rod 78 which extends outwardly through a guide bore 80 in the bushing 18. A coil spring 82 normally urges this piston to the right and to a position determined by an adjustable stop screw 84, threaded through the handle or stock portion 10 and having a hand knob 86 thereon.

The handle or stock portion 10 is provided with a passageway 90 into the lower end of which there is threaded a fitting 92 adapted to be connected by means of a suitable hose, not shown, to a source of air under pressure. At its upper end, this passageway leads into a chamber 94, formed within the bushing 16 and having a conical wall 96. Slidably mounted in the bushing 16 is a valve member 98 having a flange 100 which is normally held against the conical surface 96 by means of a compression spring 102 thereby shutting off communication between the aforementioned chamber 94 and discharge passage 104, 106 which are connected to a vertical passageway 108 leading into the cylindrical bore 70 on the right-hand side of the piston 76. Secured to the valve member 98 is an operating arm 110 which constitutes a control member and carries at its upper end an exhaust valve 112 having a guide stem 114 adapted to fit loosely in an exhaust passage 116. As will be apparent, when the operating arm 110 is moved to the right by the fingers of the hand of an operator as he grasps the handle or stock portion 10, air under pressure will be admitted to the cylinder bore 70, while the exhaust passage 116 will be closed by the valve 112. Accordingly, the piston 70 will be urged to the left until it strikes the shoulder 74. Upon release of the operating arm 110, spring 82 will return the piston to the position in which it is shown and as determined by the setting of the adjusting screw 84.

Secured to the left-hand end of the piston rod 78, by means of a setscrew 120, is a block 122 which carries two pawls 124, 124 adapted to be urged inwardly toward each other by relatively light springs 125, 125 and to the extent determined by the engagement of flanges 126, 126 on stems 128, 128, formed integrally with the mentioned pawls, with stop surfaces 130, 130 on the block 122, FIGS. 4 and 5. Preferably, and as herein illustrated, the strip of thermoplastic material P has formed along its opposite edges a series of serrations or inclined teeth 132, 132, see FIGS. 4 and 10, with which the pawls 124, 124 cooperate, thus providing for a positive feeding of the strip of thermoplastic material through the passageway 54 when the piston 16 is moved to the left. Upon return of the piston 76 to the position in which it is shown by the spring 82, the pawls 124, 124 will be readily cammed outwardly against the resistance of the light springs 125, 125 so that the plastic strip will remain in the position to which it has just previously been moved by the action of the piston.

The body portion 30 is cut away as shown in FIGS. 2 and 3 to provide end flanges 131, 133 and received within the space thus provided, and held in place against the body portion 30 by means of suitable binding material, indicated generally by the reference character 134, are a number of electrical heating units 136 each of which comprises resistance wires encased within a ceramic block and connected together and to suitable leads 138, 140. Fitted within a bore 142 in the body portion 30 is a thermostat 144 which is connected, by means of leads 146, 148, FIG. 6, in the circuit leading to the heating units 136 from two main leads 150, 152. Also interposed in this circuit is a pilot light 154. The main leads 150, 152 extend downwardly through a passageway 156 in the handle or stock portion 10 and thence through a protective cable to a suitable source of electrical energy, not shown. Also, an off-and-on switch, not shown, is provided for opening and closing the circuit in the usual manner. When this switch is closed, the pilot light 154, visible through an opening 158 in the cover 22, will glow until the circuit through the heating elements is broken by the action of the thermostat 144.

As is shown in FIGS. 1, 2 and 3 of the drawings, the several heating elements 136 are enclosed within a sheet metal casing 160 which is supported on the end flanges 131, 133 of the body portion 30 of the device. Adjacent to its right-hand end, as viewed in FIG. 2, the body portion 30 is formed with a series of heat radiating fins 162, 162 which tend to maintain the right-hand end of the barrel 36 and the bushing 38 at a temperature which is somewhat lower than the other portions of the barrel. This arrangement, together with the opening provided in the bracket 26 by the cut-away portion 28, considerably reduces the flow of heat into the handle or stock portion 10 which, as noted above, is made of some non-metallic material. In order to protect the operator from accidentally coming in contact with the bracket 26, a guard piece 164 of non-metallic material is mounted on the lower portion of this bracket and held in place by means of a screw 166, this screw also entering the bushing 18, as shown.

The stand which is illustrated in FIG. 1 comprises a base 170 of a width sufficient to provide stability and a curved supporting wall 172 secured to the base and of the shape shown. Extending outwardly from the wall 172 is a pin 174 on which the device may be suspended with the right-hand end of its body portion resting on a metallic plate 176 which is mounted on the base 170. The base 170 is provided with an open-ended slot 178 to accommodate an air supply hose, not shown, which would be attached to the fitting 92. The supporting wall is formed with two outwardly opening holes 180, 182 which are connected by a passage 184, these holes facing toward a device placed on the stand, as indicated in FIG. 1. The fitting 92 is provided with a small bleed opening 186, FIG. 2, which is in alinement with the hole 180 when the device is placed on the stand. With this arrangement, during use of the device when the air supply is turned on, if the device is placed on the stand temporarily with the electric power to the heating elements turned on, that portion of the strip of thermoplastic material P which is just outside of the entrance bushing 38 will be cooled by a blast of air emitted from the hole 184 and in this way undue softening of this strip in this location will be avoided.

The plastic portable injection device of this invention is intended for various different uses in the field of plastics but it is especially adapted for those uses which involve the injection of a predetermined quantity of molten plastic into a mold, or similar cavity, of known volume. Several examples of operations of the latter type are shown in FIGS. 7, 8 and 9 of the drawings for purposes of illustration only and without any intent to limit the utility of the present invention. Thus, in FIG. 7 the device is illustrated in connection with the formation of a plastic bridle B for use in joining the several parallel wires of an electrical harness, in FIG. 8 it is illustrated in connection with the formation of a plastic rivet R, and in FIG. 9 the device is illustrated in connection with the molding of a plastic machine screw S.

Referring to FIG. 7, a two-piece mold, including lower and upper portions 190, 192 provided with cooperating grooves 194, 196 to receive the parallel wires 198, 198 of an electrical harness, and with recesses 200, 202 to provide a mold cavity, which are adapted to be secured together in registered relation by means of a screw 204 and dowel 206. Leading into the mold chamber or cavity provided by the recesses 200, 202 is an inlet passage 208 with the two portions of the mold assembled about the wires 198, 198 and held together by the screw 204, the spherical end 68 of the nozzle 40 of the device is held firmly against the circular open end of the inlet passage 208 by the operator, who, by manipulating the operating arm 110 one or more times, injects a measured quantity of molten adhesive into the mold cavity which is just sufficient to fill this chamber, the entrance passage 208, and two small bleed passages, formed by cooperating grooves 210, 212 in the lower and upper portions of the mold. The molten plastic thus injected cools and solidifies quite quickly to provide the bridle B, as shown in FIG. 7.

In FIG. 8 the device is shown being used to inject molten plastic through alined holes formed in three superposed layers of material to form a plastic rivet R. In this example, two die members 220, 222 are mounted in a suitable holder comprising upper and lower arms 224, 226 hinged together at 228 and urged toward each other by means of a tension spring 230. The upper die member 220 has an inlet passage 232 against the circular open upper end of which the spherical end 68 of the nozzle 40 of the plastic injection device is held by the operator while he operates the device to inject the proper amount of molten plastic to form the rivet R. In FIG. 9, the device is illustrated as being used to inject molten plastic into the inlet passage 240 formed in the upper part 242 of a mold having a lower portion 244. Similarly to the other uses mentioned above, the operator holds the spherical end 68 of the nozzle 40 against the open upper end of the inlet passage 240 and, by suitable manipulation of the operating arm 110, injects the proper amount of molten plastic to form the plastic screw S.

Having thus described my invention, what I claim as new and desire to secure by Letters Patent of the United States is:

1. A portable plastic injection device having a body portion including a member provided with an elongated passageway, means for heating said member, a handle on which said body portion is supported, a reciprocable member provided with detent means for engaging and feeding a variably predetermined linear portion of a strip of thermoplastic material into one end of the passageway in the heated member thereby to cause a corresponding volume of molten material to be extruded through the other end of the passageway, fluid pressure operated means for moving said member in one direction, yieldable means for moving the member in the opposite direction, means for varying the extent of movement of said reciprocable member, a valve mechanism for controlling the admission of fluid under pressure to exhaust from said fluid pressure operated means, and means for operating the valve mechanism including a control member located adjacent to the handle and movable from an inoperative position, to exhaust fluid under pressure from said fluid pressure operated means, to an operative position, to admit fluid under pressure to said fluid pressure operated means, by the fingers of an operator as he grasps the handle and yieldable means for returning the control member to inoperative position when released by the operator, for effecting a single reciprocation of said reciprocable member in response to each movement of the control member to operative position and back to inoperative position.

2. A portable plastic injection device having a body portion including a member provided with an elongated passageway, means for heating said member, a nozzle carried by said member provided with a generally spherical operating end and a discharge opening communicating with one end of said passageway, a spring-loaded valve normally closing said one end of the passageway, a handle on which said body portion is supported, a reciprocable member provided with detent means for engaging and feeding a variably predetermined linear portion of a strip of thermoplastic material into the other end of the passageway in the heated member thereby to cause a corresponding volume of molten thermoplastic material to be extruded through the first-mentioned end of the passageway and through the discharge opening in said nozzle, fluid pressure operated means for moving said member in one direction, yieldable means for moving the member in the opposite direction, means for varying the extent of movement of said reciprocable member, a valve mechanism for controlling the admission of fluid under pressure to and exhaust from said fluid pressure operated means, and means for operating the valve mechanism including a control member located adjacent to the handle and movable from an inoperative position to exhaust fluid under pressure from said fluid pressure operated means, to an operative position, to admit fluid under pressure to said fluid pressure operated means, by the fingers of an operator as he grasps the handle and yieldable means for returning the control member to an inoperative position when released by the operator, for effecting a single reciprocation of said reciprocable member in response to each movement of the control member to operative position and back to inoperative position.

References Cited in the file of this patent
UNITED STATES PATENTS

| | | |
|---|---|---|
| 2,431,843 | Swoger | Dec. 2, 1947 |
| 2,437,263 | Manning | Mar. 9, 1948 |
| 2,742,142 | Paulsen | Apr. 17, 1956 |
| 2,804,649 | Rupfield | Sept. 3, 1957 |
| 2,892,214 | McCarthy | June 30, 1959 |